Aug. 29, 1939.  S. E. MEYERS  2,171,312
CONSISTENCY CONTROL DEVICE
Filed May 6, 1935   2 Sheets-Sheet 1
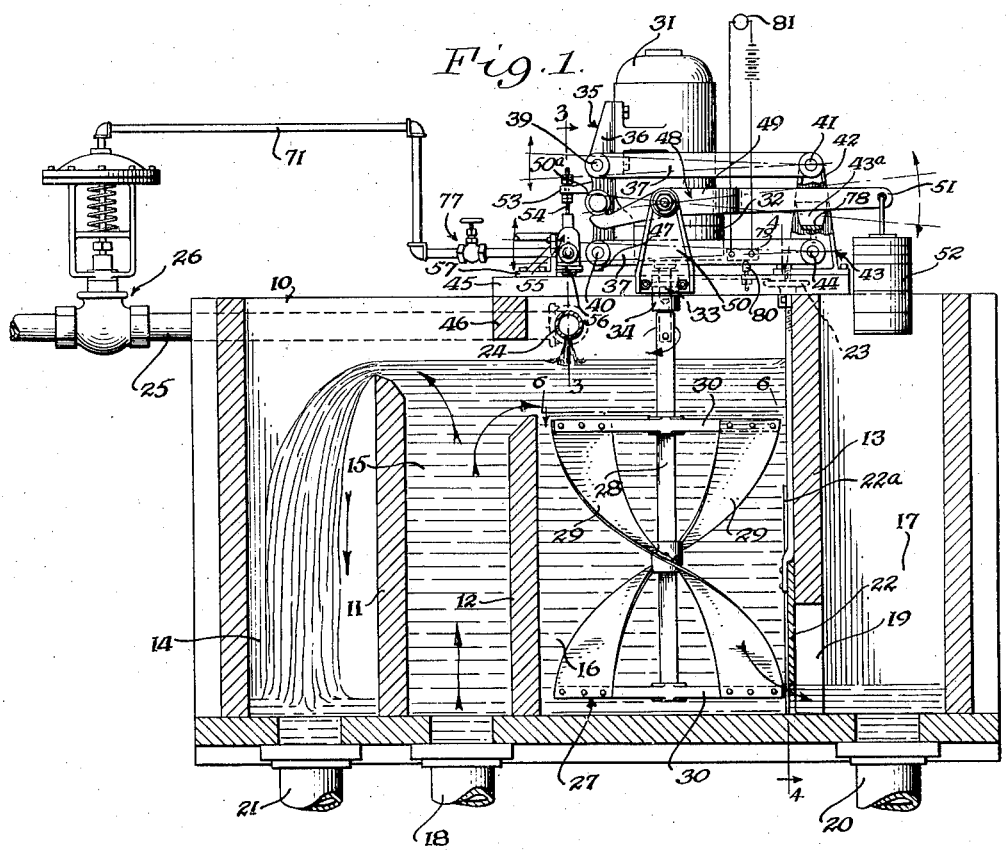
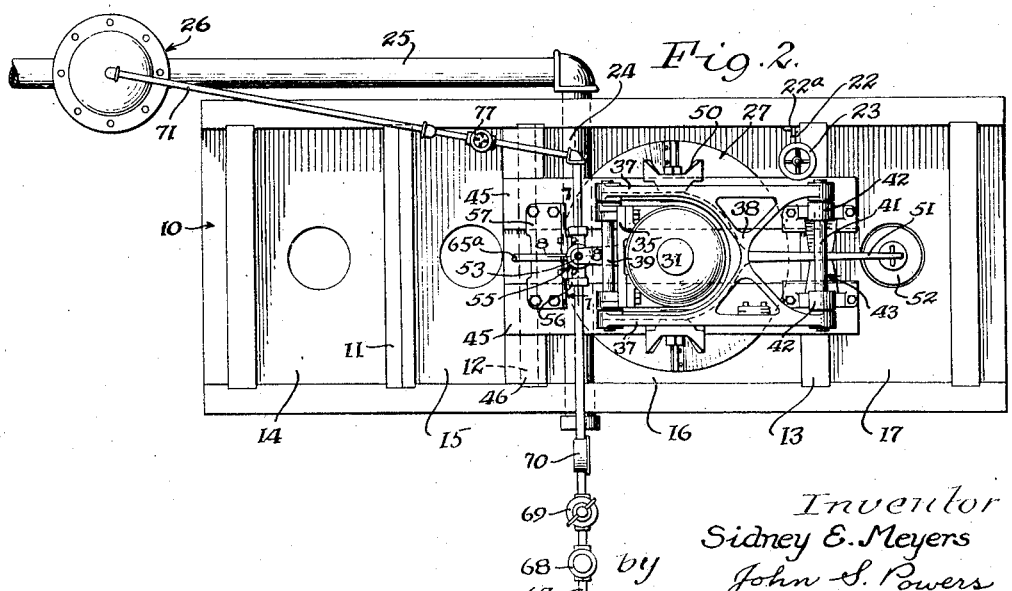
Inventor
Sidney E. Meyers
John S. Powers
Attorney Aug. 29, 1939.   S. E. MEYERS   2,171,312
CONSISTENCY CONTROL DEVICE
Filed May 6, 1935   2 Sheets-Sheet 2
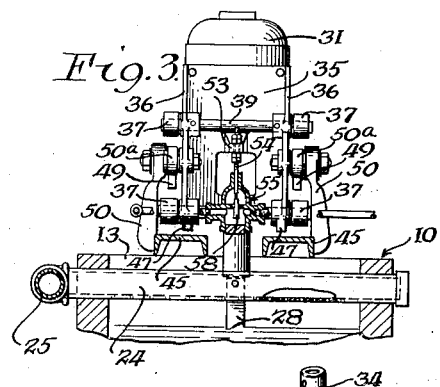
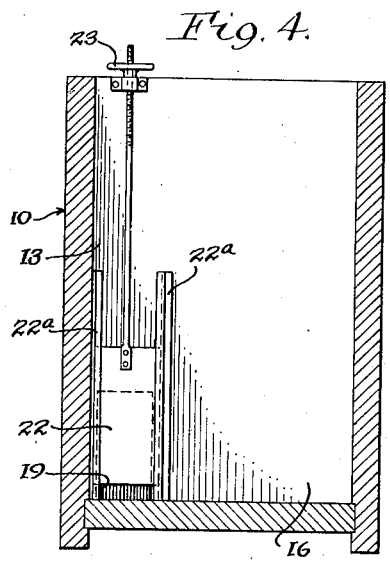
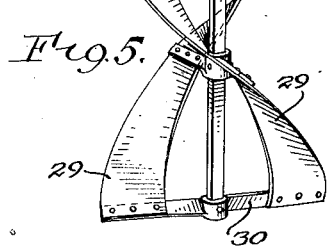
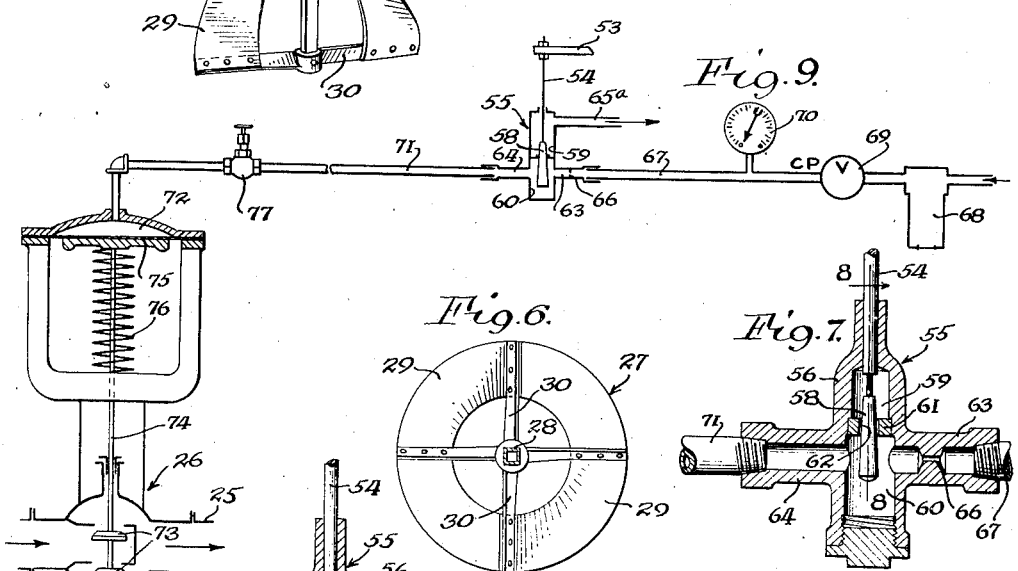
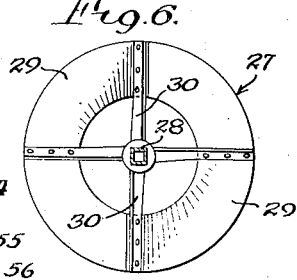
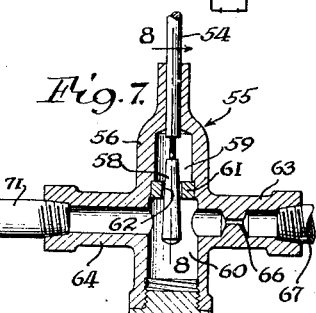
Inventor
Sidney E. Meyers
by John S. Powers
Attorney Patented Aug. 29, 1939

2,171,312

UNITED STATES PATENT OFFICE

2,171,312

CONSISTENCY CONTROL DEVICE

Sidney E. Meyers, Lockport, N. Y., assignor to Control Equipment Corporation, Buffalo, N. Y., a corporation of New York Application May 6, 1935, Serial No. 19,981

7 Claims. (Cl. 92—46)

This invention relates to a device which, although suitable for other purposes, is characterized by features which render it of particular utility as a means for regulating the addition of a modifying medium to a fluid suspension of fibrous materials such, for example, as is employed in connection with the manufacture of paper, whereby to control the consistency of the stock, and hence the weight of the paper which is produced therefrom.

The device is characterized by a control element which is immersed in the stock and which is rotated therein at a constant speed by a suitable prime mover, the control element being so designed that as it rotates the stock exercises a substantially unidirectional thrust against it. Such thrust causes the control element to move bodily in opposition to a restraining means, the said element working itself through the stock as it rotates until the thrust exercised by the material is counterbalanced by the resistance offered by the restraining means. The thrust against the control element varies as the consistency of the stock. Hence the magnitude of the movement of the control element increases as the consistency of the stock increases and decreases as the consistency of the stock decreases. The movement of the control element in response to consistency variations in the stock is utilized to control, either directly or indirectly, the amount of the modifying medium which is added to the stock. Thus, for example, if the device is adjusted to maintain the consistency of the stock at a predetermined value, the control element will move against the action of the restraining means to a position which will result in the admission of the modifying medium at a rate which will maintain such consistency and it will remain in substantially the same position so long as the consistency of the stock is substantially uniform, the thrust of the stock against the element, when rotating in such a position, counterbalancing the action of the restraining means. In the event that the consistency of the stock increases, the control element in response to such a change automatically moves to a position in which the thrust against it is again counterbalanced by the restraining means and the rate of supply of the modifying medium is increased to compensate for the increase in the consistency of the stock. On the other hand should the consistency of the stock decrease there will be a corresponding reduction in the thrust upon the control element and the latter, under the influence of the restraining means, will be moved to a new position in which the action of the restraining means is just sufficient to counterbalance such reduced thrust, the movement of the control element in this case reducing the rate of addition of the modifying medium to the stock, whereby to prevent the consistency of the stock from falling below the desired predetermined value.

One object of the invention is to provide a device which is highly sensitive to changes in the consistency of the stock and which is responsive to such changes to control the rate of addition of the modifying medium to the stock.

A further object is to provide a control device which may be adjusted with facility to condition it to the specific requirements of each run of stock and which is adapted to maintain the consistency thereof, within limits, at any desired value.

A still further object is a device of the type generally described in which provision is made for controlling the addition of the modifying medium to the stock in such a manner as to prevent "hunting" of the consistency responsive element.

A still further object is to provide a control device which is operative to effect a rapid and thorough intermingling of the modifying medium of the stock.

A still further object is to provide a novel design and arrangement of the parts of the device, whereby simplicity and economy in construction are obtained.

The invention is illustrated in the accompanying drawings in which:

Figure 1 is a vertical longitudinal section through a device constructed in accordance with the invention.

Figure 2 is a top plan view of the device.

Figure 3 is a vertical section taken along line 3—3 of Figure 1.

Figure 4 is a similar section taken along line 4—4 of the same figure.

Figure 5 is a perspective view of the consistency responsive element.

Figure 6 is a section through the said element and is taken along line 6—6 of Figure 1.

Figure 7 is an enlarged fragmentary section of the pilot valve and is taken along line 7—7 of Figure 2.

Figure 8 is a fragmentary section taken along line 8—8 of Figure 7.

Figure 9 is a diagrammatic view illustrating the manner in which the main valve is controlled by the pilot valve.

The device, as illustrated, includes a box-like receptacle 10 which is divided by partitions 11, 12 and 13 into a series of compartments 14, 15, 16 and 17. The stock whose consistency is to be lowered to a predetermined value is withdrawn from a suitable place of storage and is introduced into the compartment 15 through a pipe 18. It flows over the partition 12 into the compartment 16. From the latter it passes through an opening 19, which is formed at the bottom of the partition 13, into the compartment 17 and is discharged therefrom through a conduit 20 by which it may be conducted to a suitable processing machine. The partition 11 serves to maintain a constant head of stock in the compartment 16, the excess stock overflowing the said partition and entering the compartment 14 from which it may be returned to the storage space through a conduit 21. The rate of flow of the stock through the compartment 16 is regulated by a gate 22 which is slidably mounted between guides 22a for movement over the opening 19, a handwheel 23 being available for adjusting the said gate. The medium which is utilized to reduce the consistency of the stock and which, for example, in the case of paper stock is water, is introduced into the compartment 16 through a pipe 24 which extends transversely of the receptacle above the level of the stock, the said pipe communicating through a lateral extension 25 with a water supply conduit and being suitably perforated so as to discharge the water in jets. The water which is discharged from the pipe 24 mixes with the stock passing through the compartment 16 and reduces its consistency, the amount of water introduced into the compartment 16 being regulated by a valve 26 which is included in the extension 25.

The valve 26 is regulated automatically, in accordance with the consistency of the stock in the compartment 16, to admit water at a rate which will lower the consistency of the stock to the desired value. To this end a consistency responsive element 27 which is located in the compartment 16 is completely immersed in the stock. The said element, as illustrated, includes a central shaft 28 and a pair of helical blades 29. The latter are located at opposite sides of said shaft and are carried by radially extending arms 30, certain of said arms being connected to the ends of said blades and others being connected to their midsections. From their lower ends to their upper ends each blade follows a spiral path from left to right through an angular distance of approximately 180°, the angle of inclination of the blades preferably being of the order of 45° although this may be varied as circumstances may require. The element 27 is rotated in a clockwise direction by a constant speed electric motor 31 which carries a conventional reducing gear head 32, the driven shaft 33 thereof being connected to the shaft 28 of the element 27 by a coupling 34. It will be apparent that as the element 27 rotates in the stock at a constant speed, there will be an upward thrust against the blades 29 which will vary as the consistency of the stock, that is to say, as the consistency of the stock increases the upward thrust against the blades will increase and as it decreases the upward thrust against the blades will decrease.

The invention contemplates the utilization of the variable thrust exercised against the blades 29 by the stock to regulate the valve 26 and thereby control the admission of water to the compartment 16. To this end the motor 31 is suitably secured to a vertical member 35 which is formed or provided at opposite sides with marginal flanges 36. The said member is carried by four arms 37 which are arranged in upper and lower pairs, the arms of each pair being joined together by a connecting web 38 to provide a unitary frame. At their outer ends the upper arms 37 are pivotally connected to the opposite ends of a shaft 39 which extends between, and which is carried by, the flanges of the member 35, while the outer ends of the lower arms are similarly connected to a lower shaft 40 which is also carried by the said flanges. The upper arms 37 are pivotally mounted at their inner ends upon a shaft 41 which is supported between spaced uprights 42, the said uprights, as illustrated, being parts of a unitary standard 43 which is formed with a central opening 43a. The lower arms 37 are pivotally mounted at their inner ends upon a second shaft 44 which is mounted between the uprights 42 below the said opening. The standard 43 is mounted upon a pair of horizontal structural members 45, which are arranged over the compartment 16 and which are supported at one end upon the partition 13 and at their opposite ends upon a support 46 which is located over the partition 12, the upright portions of the standard 43 being formed with suitable flanges which are utilized in securing the standard to the structural members.

Projections 47 which are formed or provided at the lower corners of the member 35 are adapted to rest upon the structural members 45 to support the motor and element in a substantially vertical position when the motor 31 is deenergized and the element 27 is stationary. Preferably a part of the weight of the motor and element is counterbalanced by a member 48 which is forked at one end to provide arms 49 which straddle the motor, the said arms being pivotally mounted, intermediate their ends, between the upper ends of a pair of standards 50 which are secured to the structural members 45 and their free ends engaging under rollers 50a which are carried by the flanges of the member 35. The member 48 includes a rearwardly extending tail-piece 51 which passes through the opening 43a in the standard 43 and which carries a set of adjustable weights 52.

From the foregoing it will be apparent that the arms 37 support the motor 31 and element 27 for floating movement in a substantially vertical plane. The weight of the motor 31, element 27 and associated parts is a constant factor and a substantial part of such weight is counterbalanced by the weights 52. On the other hand when the element 27 rotates at a constant speed the stock exercises an upward thrust against the blades 29 and such thrust varies as the consistency of the stock. Hence as the element 27 rotates in a clockwise direction it works itself up through the stock, carrying the motor with it, until a point is reached at which the combined action of the thrust upon the blades 29 and the weights 52 is counterbalanced by the weight of the motor 31, element 27 and associated parts. Thereafter the element 27 will rotate in the same position so long as the consistency of the stock remains constant. Should the consistency of the stock vary, however, the element will move to a new position to reestablish the balance of the system, rising further upwardly through the stock when the consistency thereof increases and falling as the consistency decreases. Various of the weights 52 may be removed or replaced to adjust the device in accordance with the approximate initial consistency of the stock and thereby insure movement of the element 27 in the manner described.

As the magnitude of the movement of the element 27 varies as the consistency of the stock, it is proposed to utilize such movement to control the addition of the modifying medium to the stock in the compartment 16. For this purpose a laterally extending arm 53 is formed or provided upon the member 35. The said arm is connected to the stem 54 of a pilot valve 55 (Figures 7 and 8), the casing 56 of the latter being carried by a bracket 57 which is suitably secured to the structural members 45. The casing 56 is formed to provide central chambers 59 and 60 which are separated by a partition 61, the valve stem 54 carrying a head 58 which extends through an opening 62 formed in the said partition. The head 58 is elongated and tapered, the degree of taper being relatively slight, and it co-operates with a seat provided by the defining wall of the opening 62.

It will be apparent that as the valve head 58 is connected to the member 54 its movement will correspond to that of the consistency responsive element 27, the said head being so designed that it fits against the seat provided by the partition 61 to close the opening 62 when the element 27 is at the upper limit of its range of movement and opens to its greatest extent when the said element is at the lower limit of its range of movement. In other words, as the consistency of the stock increases the head 58 moves to reduce the size of the passage connecting the chambers 59 and 60 and as the consistency of the stock decreases it moves to increase the size of the passage connecting the said chambers. In this connection it is understood, of course, that the hole through the arm 53 for accommodating the valve stem 54 is preferably slightly larger in diameter than the said stem in order to prevent it from binding in the valve casing as the member 35 moves in the relatively flat arc which constitutes its range of movement.

The valve casing 56 is formed with opposed branches 63 and 64 (Figure 7) both of which communicate with the chamber 60 and with an opening 65 (Figure 8) which provides an outlet from the chamber 59. The branch 63 which constitutes the inlet to the chamber 60 is formed to provide an orifice 66 and is adapted to be connected by a conduit 67 (Figure 9) to a suitable source of fluid under pressure, for example, water. The conduit 67 includes a strainer 68 for filtering out any solid particles which may be suspended in the fluid. It also includes a valve 69 which is adjustable to reduce the pressure of the fluid to a constant predetermined value, such pressure being indicated upon a suitable gauge 70. The branch 64 is connected by a conduit 71 to the expansion chamber 72 of the valve 26, the said valve including heads 73 which are carried by a stem 74 and which control the rate of flow of the modifying medium through the valve, a flexible diaphragm 75 which is movable in response to the pressure in the chamber 72 to move the heads 73 toward an open position and a spring 76 which resiliently urges the heads 73 toward a closed position. The conduit 71 also includes an adjustable choke valve 77. Fluid from the conduit 67 enters the chamber 60 through the orifice 66 at a constant predetermined rate. A portion of it passes from the chamber 60 through the conduit 71 and valve 77 and enters the expansion chamber 72 of the valve 26. At the same time fluid from the chamber 60 passes through the opening 62 into the chamber 59 at a rate determined by the position of the valve head 58, the fluid entering the chamber 59 and discharging therefrom through a pipe 65a which communicates with it through the opening 65.

In the operation of the device it will be apparent that as the fluid enters the chamber 60 at a constant rate the pressure in the expansion chamber 72 of the valve 26, and hence the rate at which the modifying medium is permitted to pass through the valve, will vary in accordance with the rate that the fluid is permitted to escape from the chamber 60, the rate of flow of the modifying medium through the valve increasing as the rate of discharge of the fluid from the chamber 60 is decreased and decreasing as the rate of flow of the fluid from the chamber 60 is increased. As the valve head 58 is moved to decrease the discharge of fluid from the chamber 60 when the consistency of the stock increases, the supply of the modifying medium to the stock will be increased at such times. On the other hand when the consistency of the stock decreases and the valve head 58 is moved to increase the rate of discharge of the fluid from the chamber 60, there will be a corresponding reduction in the rate at which the modifying medium is added to the stock. In this connection it is understood, of course, that the weights 52 may be adjusted at the outset, in accordance with the approximate initial consistency of the stock, so as to insure movement of the element 27 in the manner described.

The choke valve 77 is adjustable to vary the sensitivity of the valve 26, that is to say to regulate the speed at which the latter moves toward its open and closed positions. This has the advantage that "hunting" of the element 27 can be prevented as the speed at which the valve 26 opens and closes, and hence the rate at which the modifying medium is admitted to the compartment 16, may be regulated in accordance with the consistency of the stock and the rate at which it is caused to flow through the compartment 16, it being understood in this connection that if the modifying medium is admitted too fast the element 27 will move rapidly back and forth between the two limits of its range of movement instead of assuming an intermediate position at which the consistency of the stock is reduced to the desired value by admitting the modifying medium at a substantially uniform rate. In other words the choke valve 77 can be adjusted so that the valve 26 will move towards its open and closed positions at a speed which is most suitable to the requirements of the particular run of stock.

In addition to its controlling the rate at which the modifying medium is permitted to enter the compartment 16, the element 27 serves to mix the said medium thoroughly with the stock. Thorough and rapid treatment of the stock is thereby insured. It will be noted that the partition 11 is of such a heighth that the element 27 will be entirely immersed in the stock at all points in its range of movement. Hence the entire area of the blades will be presented to the stock regardless of the position of the element.

The element 27 is illustrated in Figure 1 in the vicinity of the lower limit of its range of movement, the projections 47 being located a short distance above the structural members 45. It will be noted that upward movement of the element 27 causes the tail-piece 51 of the member 48 to move downwardly. A stop 78 which is provided by the lower wall of the opening 43a limits the downward movement of the tail-piece 51 and hence serves to limit the upward movement of the element 27.

At the outset the device is adjusted with respect to the average consistency of the stock and it is responsive, within limits, to changes above and below such consistency. In the event that the consistency of the stock falls so far below the value for which the device is adjusted that the element 27 approaches the lower limit of its range of movement, an electric switch 79 (Figure 1) which is carried on an arm 37 engages a stop 80 which is fixed to a structural member 45 and is closed thereby to energize a signal lamp 81 or any suitable indicator. This will inform the operator that the initial consistency of the stock is too low and should be corrected.

In the illustrated embodiment of the invention the consistency responsive element controls the valve 26 indirectly through the agency of the pilot valve 55. While this is preferred it is to be understood that the invention contemplates the direct control of the valve 26 by the element 27 if it should be desired.

I claim as my invention:

1. In a device for controlling the addition of a modifying medium to a fluid suspension, the combination with a receptacle having a mixing compartment through which the fluid suspension is caused to flow, a conduit for supplying said medium to said compartment and a valve in said conduit, of an element in said compartment which is immersed in said suspension, a motor for rotating said element, stationary means carried by said receptacle, arms pivotally connected to said stationary means and carrying a vertical member, said arms and member providing a floating support for said motor, means for counterbalancing a part of the weight of said motor and element, said motor and element being movable as a unit in response to the thrust of said suspension against said element, the magnitude of such movement varying in accordance with the consistency of said suspension and means responsive to the movement of said motor and element for regulating said valve, whereby the modifying medium is introduced into said compartment at a rate determined by the consistency of said suspension.

2. In a device for controlling the addition of a modifying medium to a fluid suspension, the combination with a receptacle having a mixing compartment through which the fluid suspension is caused to flow, a conduit for supplying said medium to said compartment and a valve in said conduit, of an element in said compartment which is immersed in said suspension, said element having a central shaft and at least one helical blade carried thereby, a motor connected to said shaft for rotating said element, stationary means carried by said receptacle, arms pivotally connected to said stationary means and carrying a vertical member, said arms and member providing a floating support for said motor, means for counterbalancing a part of the weight of said motor and element, said motor and element being movable as a unit in response to the thrust of said suspension against said blade, the magnitude of such movement varying in accordance with the consistency of said suspension and means carried by said vertical member for regulating said valve, whereby the modifying medium is introduced into said compartment at a rate determined by the consistency of said suspension.

3. In a device for controlling the addition of a modifying medium to a fluid suspension, the combination with a supply conduit for said medium and a valve in said conduit, said valve having an expansion chamber, of an element which is immersed in said suspension, means for rotating said element, said element being movable in response to the thrust of said suspension against it, the magnitude of such movement varying in accordance with the consistency of said suspension, a pilot valve having an inlet chamber and an outlet, a pipe connecting the inlet chamber of said pilot valve and the expansion chamber of said first mentioned valve, means for supplying a fluid to the inlet chamber of said pilot valve at a predetermined pressure and at a substantially uniform rate, and means actuated by the movement of said element for permitting the escape of the fluid from the inlet chamber of said pilot valve at a rate which decreases as the consistency of the fluid suspension increases and increases as the consistency of the fluid suspension decreases, whereby to regulate said first mentioned valve so that the modifying medium is added to said fluid suspension at a rate which will reduce its consistency to a predetermined value.

4. In a device for controlling the addition of a modifying medium to a fluid suspension, the combination with a supply conduit for said medium and a valve in said conduit, said valve having an expansion chamber, of an element which is immersed in said suspension, means for rotating said element, said element being movable in response to the thrust of said suspension against it, the magnitude of such movement varying in accordance with the consistency of said suspension, a pilot valve having an inlet chamber and an outlet, a pipe connecting the inlet chamber of said pilot valve and the expansion chamber of said first mentioned valve, means for introducing a fluid into the inlet chamber of said pilot valve at a predetermined pressure and at a substantially uniform rate, means actuated by the movement of said element for permitting the escape of the fluid from the inlet chamber of said pilot valve at a rate which decreases as the consistency of the fluid suspension increases and increases as the consistency of the said suspension decreases, whereby to regulate said first mentioned valve so that the modifying medium is added to said fluid suspension at a rate which will reduce its consistency to a predetermined value and a choke valve in the pipe connecting the pilot valve with said first mentioned valve, whereby the sensitivity of the latter may be regulated to prevent "hunting" of said element.

5. In a device for controlling the addition of a modifying medium to a fluid suspension, the combination with a supply conduit and a valve in said conduit, said valve having an expansion chamber, of an element which is immersed in said suspension, a motor for rotating said element, a floating support for said motor, said motor and element being movable as a unit in response to the thrust of said suspension against said element, the magnitude of such movement varying in accordance with the consistency of said suspension, a pilot valve having an inlet chamber, an outlet and a head for varying the cross-sectional area of said outlet, a pipe for connecting the inlet chamber of said pilot valve and the expansion chamber of said first mentioned valve, means for supplying a fluid to the inlet chamber of said pilot valve at a predetermined constant pressure and at a substantially uniform rate and means connecting said valve head and said floating support, whereby said head is responsive to the movement of said element to permit the escape of the fluid from the inlet chamber of said pilot valve at a rate which decreases as the consistency of the fluid suspension increases and increases as the consistency of the fluid suspension decreases, whereby to regulate said first mentioned valve so that the modifying medium is added to said fluid suspension at a rate which will reduce its consistency to a predetermined value.

6. In a device for controlling the addition of a modifying medium to a fluid suspension, the combination with a supply conduit for said medium and a valve in said conduit, said valve having an expansion chamber, of an element which is immersed in said suspension, said element having a helically inclined surface, a motor for rotating said element, a floating support for said motor, means for counterbalancing a part of the weight of said motor and element, said motor and element being movable as a unit in response to the thrust exercised by said fluid medium against said helically inclined surface, the magnitude of such movement varying in accordance with the consistency of said fluid suspension, a pilot valve having an inlet chamber, an outlet and a head for varying the cross-sectional area of said outlet, a pipe connecting the inlet chamber of said pilot valve and the expansion chamber of said first mentioned valve, means for supplying a fluid to the inlet chamber of said pilot valve at a predetermined constant pressure and at a substantially uniform rate, and means connecting said valve head and said floating support, whereby said head is responsive to the movement of said element to permit the said fluid to escape from the inlet chamber of said pilot valve at such a rate that said first mentioned valve will be regulated to control the addition of the modifying medium to the fluid suspension.

7. In a device for controlling the addition of a modifying medium to a fluid suspension, the combination with a supply conduit for said medium and a valve in said conduit, said valve having an expansion chamber, of an element which is immersed in said suspension, means for rotating said element, said element being movable in response to the thrust of said suspension against it, the magnitude of such movement varying in accordance with the consistency of said suspension, a pilot valve having an inlet chamber and an outlet, a pipe connecting the inlet chamber of said pilot valve and the expansion chamber of said first mentioned valve, means for supplying a fluid to the inlet chamber of said pilot valve at a predetermined pressure and a substantially uniform rate and means actuated by the movement of said element for regulating the escape of the fluid from the inlet chamber of said pilot valve, whereby to control said first mentioned valve and permit the modifying medium to be added to the fluid suspension at a rate which will reduce its consistency to a predetermined value.

SIDNEY E. MEYERS.